United States Patent [19]

Pendergrass

[11] 4,438,881
[45] Mar. 27, 1984

[54] SOLAR ASSISTED HEAT PUMP HEATING SYSTEM

[76] Inventor: Joseph C. Pendergrass, 1283 Wessel Rd., Gainesville, Ga. 30501

[21] Appl. No.: 228,919

[22] Filed: Jan. 27, 1981

[51] Int. Cl.³ .................. G05D 23/00; F25B 27/02
[52] U.S. Cl. ............................ 237/2 B; 62/238.6; 62/235.1
[58] Field of Search ............ 237/2 B; 62/238.6, 324.1, 62/235.1, 260, 160, 180, 181, 182, 177, 178; 126/427

[56] References Cited

U.S. PATENT DOCUMENTS

| | | | |
|---|---|---|---|
| 3,449,922 | 6/1969 | Ruff et al. | 62/160 |
| 4,190,199 | 2/1980 | Gawley et al. | 126/427 |
| 4,254,636 | 3/1981 | Zebuhr | 62/238.6 |
| 4,299,098 | 11/1981 | Derosier | 62/160 |
| 4,330,309 | 5/1982 | Robinson, Jr. | 237/2 B |

*Primary Examiner*—Albert J. Makay
*Assistant Examiner*—Henry Bennett
*Attorney, Agent, or Firm*—King and Liles

[57] ABSTRACT

A solar assisted heat pump fluid heating system capable of reliable operation at higher than normal ambient temperatures is disclosed. The system includes a collection of solar panels and primary fluid storage tanks having integral coiled heat exchangers interconnected and charged with heat transfer fluid to produce heat. Temperature sensors positioned at the panels and storage tanks transmit temperature signals to solar control circuit. At predetermined temperatures, the solar control circuit energizes a first circulation pump transferring heated fluid from the panels, effecting heat transfer with a low temperature working fluid stored in the tanks. A second circulation pump transfers stored working fluid to a heat exchanger, effecting heat transfer. A heat pump generating a hot refrigerant fluid provides additional heat input when entering working fluid to the heat exchanger is below a predetermined temperature. The heat pump includes an evaporator, compressor and accumulator interconnected in refrigerant flow relationship to provide the hot gas to the heat exchanger. A motor driven evaporator fan circulates ambient air through the evaporator to heat the refrigerant fluid. The heated fluid is then compressed into a superheated refrigerant gas. A modulating control circuit detects fluid temperature of refrigerant leaving the evaporator and controls the fan speed to maintain the fluid within a predetermined temperature range. By restricting ambient air flow through the evaporator, heat pump operation at higher than normal ambient temperatures is possible. Alternatively, damper vanes positioned adjacent openings exposing the evaporator to ambient air are operated by a modulating motor, energized by the modulating control circuit to further restrict air flow and control refrigerant fluid temperature. Heated working fluid leaving the heat exchanger is stored in secondary storage tanks. A third circulation pump with thermostatic control circuit mixes fluid in the primary and secondary tanks, to obtain better fluid heating when temperatures at the solar collecting panel are below a predetermined temperature.

31 Claims, 8 Drawing Figures

SOLAR ASSISTED HEAT PUMP HEATING SYSTEM

BACKGROUND OF THE INVENTION

This invention generally relates to fluid heating apparatus, and more particularly, to a fluid heating system utilizing a heat pump capable of reliable operation at higher than normal ambient temperatures and assisted by a solar heating means.

In view of the ever decreasing supply of fossil and other nonrenewable resource fuels, reflected in the rising cost of gas and electricity, it has become increasingly desirable to attempt alternative approaches to heating hot water and other fluids in a reliable manner. One such attempt involves exploiting the energy of the sun, wherein a collection of solar panels exposed to solar energy containing a fluid heat transfer medium flowing into a heat exchange relationship with the building water supply or the like being heated.

While solar energy is known for use in heating homes and other installations, such known means are expensive and complex to control, especially due to unpredictable weather patterns. To meet projected demand during periods of low solar energy input, large capacity storage tanks and a large number of solar collecting panels are often required. Furthermore, exclusive use of solar heating systems is not feasible in many regions of the country, and conventional back-up heating systems such as electric, oil or gas heaters are necessary, thereby raising heating costs. However, since solar heating is often a reliable heating source under optimal conditions of sunlight, it would be desirable to combine a solar heating system with a heating system capable of cost-effective, reliable operation.

Heat pumps are becoming more and more widely used for heating systems. A typical heat pump extracts heat energy stored in a heat reservoir, such as the earth's atmosphere, by circulating an ambient air flow through evaporator coils charged with a refrigerant fluid, thereby effecting heating of the fluid within the coils. The heated refrigerant is then dumped into an accumulator where warm saturated vapor enters a suction line transferring the vapor to a compressor. The vapor is compressed into a high pressure and temperature refrigerant gas. The superheated gas is discharged from the compressor into a heat exchanger, effecting heat transfer to low temperature water. The hot water is used for domestic heating, hot water and other uses.

Conventional heat pumps are designed to operate in the heating mode at maximum ambient temperatures of 60° F. to 70° F. At higher temperatures, excessive heating of refrigerant fluid increases the temperature of the compressor shell and motor windings resulting in overloading of the heat pump system. Accordingly, at ambient temperatures in excess of 70° F., conventional heat pumps cease operation and less efficient back-up conventional heaters must be relied upon for reliable heating, resulting in increased fuel costs.

SUMMARY OF THE INVENTION

It is accordingly an object of the present invention to provide a combined solar and heat pump heating system capable of reliable operation under a wide range of demand and weather conditions.

Another object of the invention is to provide a heat pump heating system capable of operating at higher ambient temperatures.

Yet another object is to provide a heat pump wherein additional heating capacity is achieved at high ambient temperatures by reducing air flow over the evaporator to control the temperature of refrigerant fluid entering the compressor.

Still another object is to provide a combined solar heat pump heating system wherein heat pump operation is limited to periods when solar heating is ineffective to meet the demand thus assuring maximum efficiency of the system.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

A solar assisted heat pump fluid heating system, in accordance with the present invention, is capable of efficient and reliable operation under substantially all conditions of demand and temperatures The solar heating means of the system include solar heat collecting panels, solar heat exchanger means and a circulation pump, all interconnected and charged with heat transfer fluid for effecting heat transfer to a working fluid in a primary fluid storage means. Solar control means, including a solar control circuit, energizes the pump effecting heat transfer in response to predetermined temperatures detected by solar temperature sensing means. Such solar temperature sensing means preferably includes temperature sensors positioned at the solar collecting panels and the primary fluid storage means.

A second pump transfers the low temperature working fluid between the primary fluid storage means and a heat exchanger coupled to a heat pump. This heat exchanger is preferably of the type wherein heat is transferred between two fluids contained in separate adjacent coil systems through the agency of a third fluid. A temperature sensing means energizes the heat pump when the temperature of working fluid entering the heat exchanger is below a predetermined temperature.

Preferably, the heat pump includes a compressor and an evaporator interconnected with the heat exchanger acting as a condensor. An evaporator fan, driven by a motor, circulates ambient air through the evaporator to heat the refrigerant fluid. Heated refrigerant fluid is compressed into a hot refrigerant gas by the compressor and discharged into the heat exchanger in heat exchange relationship with the low temperature working fluid. A refrigerant temperature sensor is positioned between the evaporator and compressor. Modulating means, responsive to the refrigerant temperature sensor, controls the flow of ambient air through the evaporator to maintain a predetermined temperature range of the refrigerant fluid, enabling the heat pump to operate at higher than normal ambient temperatures.

Preferably, such modulating means includes a modulating control circuit connected to the fan motor. As refrigerant fluid temperature increases, the control circuit reduces the fan speed to restrict the flow of air through the evaporator, thereby preventing overheating and rapid boiling of the fluid. Consequently, the compressor is not overheated and it is possible to maintain operation of the heat pump even at these elevated temperatures.

In another embodiment, the modulating means may include a modulating damper. Preferably, the damper includes a plurality of damper vanes positioned to cover the openings in the evaporator housing exposing the evaporator coils to ambient air. The modulating control circuit energizes a motor for opening and closing dampers to maintain a predetermined liquid level and temperature range of the refrigerant fluid in the evaporator.

The heating system according to the invention may further comprise secondary fluid storage means, such as heat insulated storage tanks, interconnected with the heat exchanger for the heat pump.

A third circulation pump interconnects the secondary fluid storage tanks with the primary fluid storage means to effect intermixing of the low temperature working fluid. The third circulation pump is responsive to the solar control circuit for effecting mixing only when the ambient temperature at the solar collecting panels is below a predetermined temperature. Mixing of the fluids ensures efficient fluid heating by maximizing the total storage capacity of the system as the working fluid is transferred from the storage tanks to the heat exchanger.

BRIEF DESCRIPTION OF THE DRAWINGS

FIG. 8 is a graph representing reduction of fan speed within a predetermined refrigerant fluid temperature range.

DETAILED DESCRIPTION OF THE INVENTION

Figure 1:
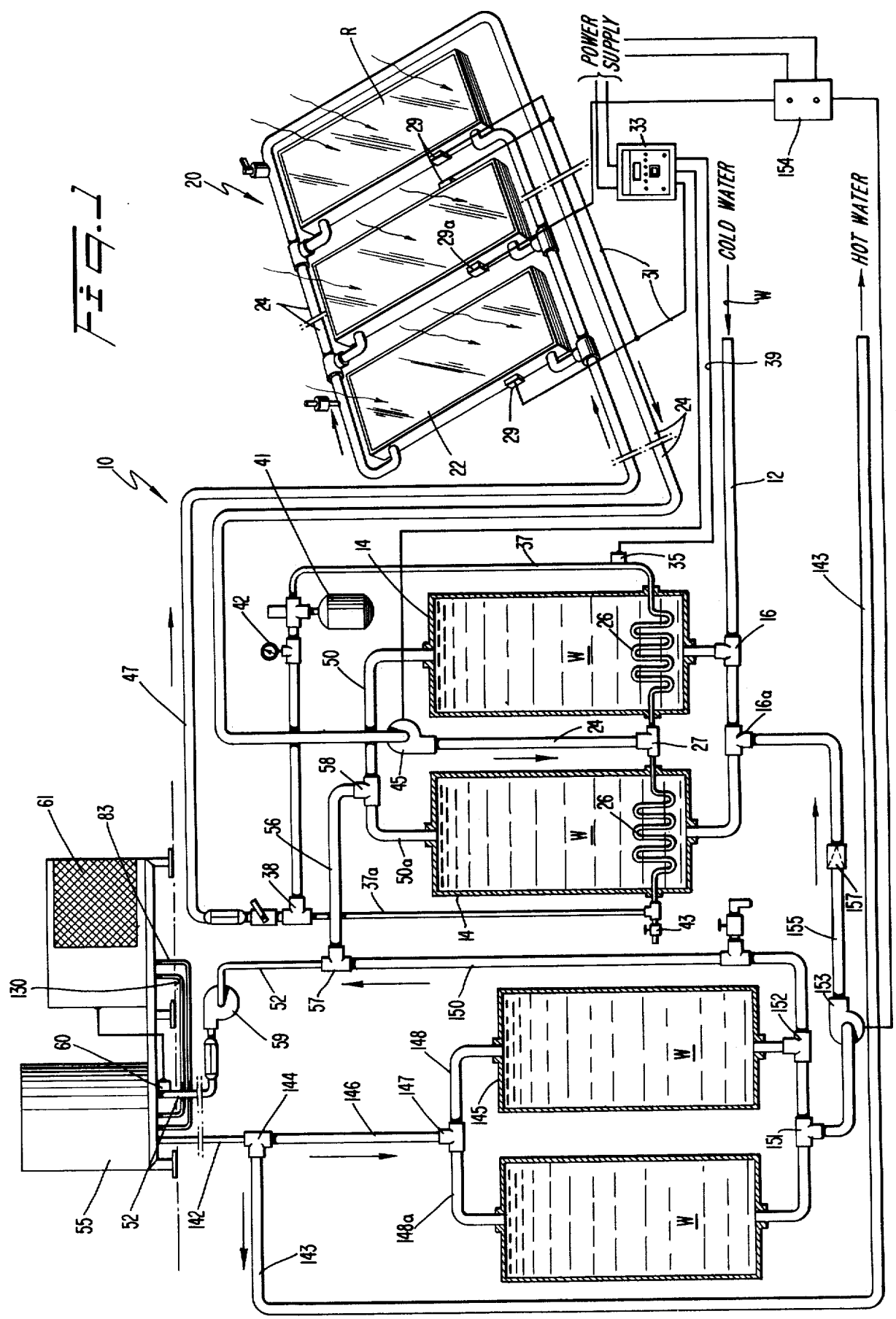
FIG. 1 is a schematic view of the solar assisted/heat pump heating system of the present invention.

Reference will now be made in detail to the present preferred embodiment of the invention, an example of which is illustrated in the accompanying drawing. Referring first to FIG. 1, solar assisted/heat pump fluid heating system 10 is illustrated. A low temperature working fluid W enters heating system 10 through inlet means, such as inlet pipe 12, and is stored in primary fluid storage means. Preferably, such primary fluid storage means includes a plurality of heat insulated storage tanks 14, interconnected with the inlet pipe 12 by T-connectors 16, 16a.

Heating of the fluid W in storage tanks 14 is effected by solar heat collecting means, such as solar collector panels 20. Each panel 20 typically includes a tempered glass cover 22 positioned over a copper tube absorber (not shown in detail). The absorber is charged with a heat transfer fluid such as an anti-freeze mixture of propylene glycol and distilled water. Panels 20 are connected in parallel to feed pipe 24 including first circulation pump 45 for transferring the solar heated transfer fluid to solar heat exchangers 26 located within storage tanks 14. The tanks 14 are interconnected by T-connector 27. Panel temperature sensors 29 are attached to panels 20, and transmit a composite panel temperature signal through control line 31 to solar control circuit 33, such as the type C-110 available from Independent Energy Inc., East Greenwich, RI 02818.

Storage temperature sensor 35, attached to at least one return conduit 37, 37a transferring heat transfer fluid out of solar heat exchangers 26, transmits the storage fluid temperature signal through control line 39 to the solar control circuit 33. A solar systemizer, including expansion tank 41 and pressure gauge 42 are provided along the return conduit 37. A fill and drain valve is provided at the beginning of the return conduit 37a, and the conduits 37, 37a merge at T-connector 38. Return pipe 47 carries the fluid from this point through a balancing valve and flow meter (see FIG. 1) back to the solar panels 20 to complete the heat transfer cycle.

Panels 20 are generally disposed at an inclined angle facing south for maximum exposure to the sun. Solar radiation, indicated by arrows R in FIG. 1, strikes panels 20 heating the transfer fluid. As indicated above, an ambient fluid temperature signal is transmitted by panel sensors 29 to solar control circuit 33. Similarly, storage temperature sensor 35 relays a corresponding temperature signal. Solar control circuit 33, upon detecting a predetermined temperature differential of approximately 20° F., energizes the first circulation pump 45, for transferring heated transfer fluid from panels 20 to solar heat exchangers 26 affecting heat transfer to fluid W. Thereafter, return conduit 37, 37a and return pipe 47 transfer the heat transfer fluid to panels 20 for reheating.

For the purpose of maintaining low temperature working fluid W within a preferred predetermined temperature range, such as 110° to 130° F. for domestic hot water, feed pipes 50, 50a interconnect tanks 14 in parallel and carry fluid from the top portion of the tanks, where stored fluid temperature is highest, to heat exchanger inlet pipe 52 and a flow meter (see FIG. 1) leading into heat exchanger 55. As shown in FIG. 1, T-connector 58 interconnects feed pipes 50, 50a with an intermediate pipe 56 connected to inlet pipe 52 by T-connector 57. With this piping arrangement, fluid is continuously transferred to heat exchanger 55 by a second circulation pump 59 attached to inlet pipe 52. Temperature sensor 60 is positioned adjacent heat exchanger inlet pipe 52 to detect the incoming fluid temperature. Suitable relay means (not shown) responsive to sensor 60 is provided for energizing heat pump 61 when the incoming fluid temperature falls below approximately 94° F. depending on the water flow rate. The heat pump cycles off when the temperature reaches approximately 120° F. depending on the flow rate.

Figure 2:
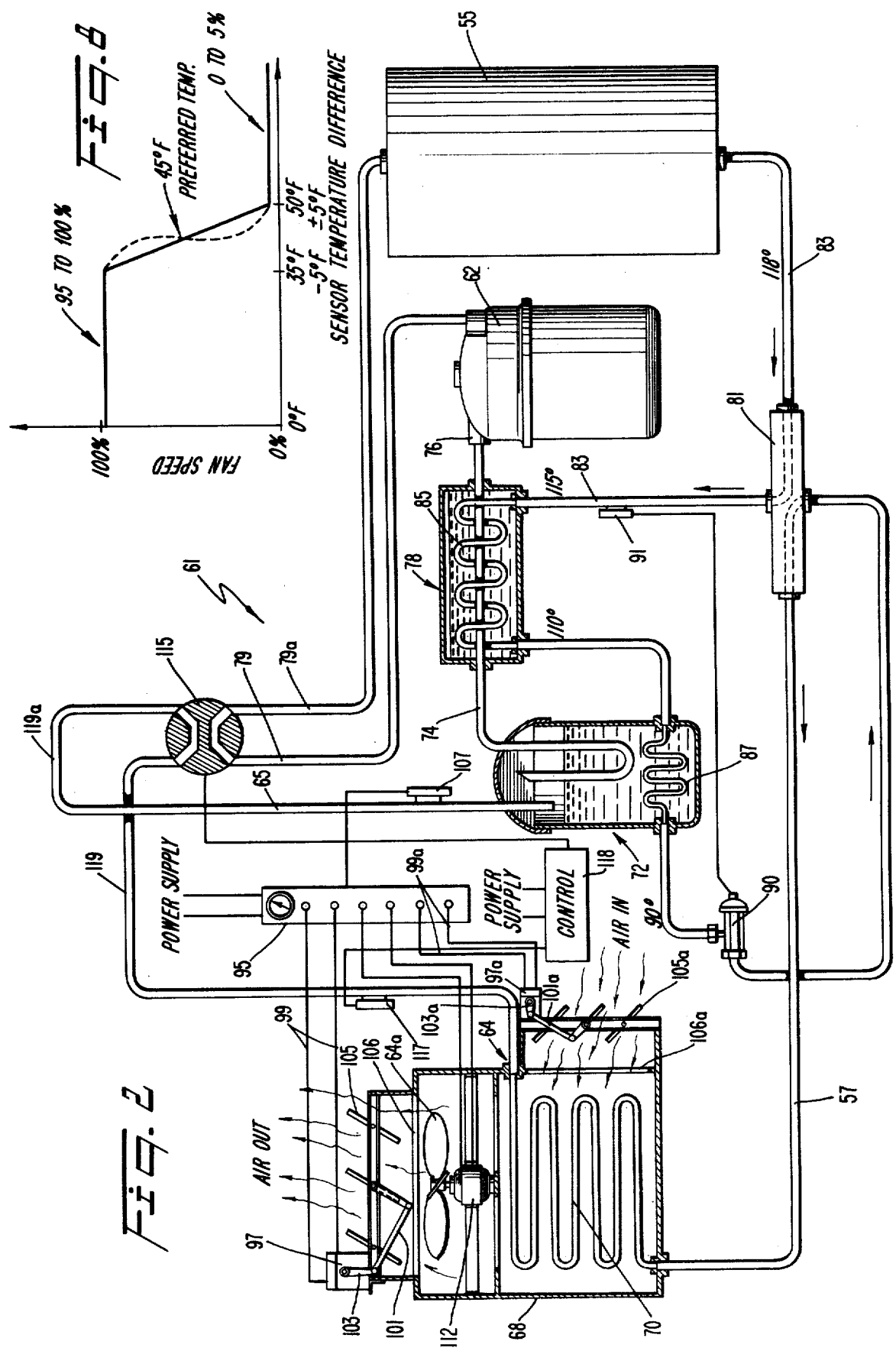
FIG. 2 is a schematic view of the heat pump system, and shows restricting of ambient air flow through the evaporator using a modulating damper means.

As shown in FIG. 2, heat pump 61 preferably includes a compressor 62, evaporator 64 and heat exchanger 55 interconnected in refrigerant flow relationship. The refrigerant lines and heat pump components are charged with a refrigerant fluid, such as Freon. When heating is required, evaporator fan 64a draws ambient air through entry opening 106a in housing 68. The air flow is pulled upward through evaporator coils 70, charged with low temperature and pressure refrigerant, effecting refrigerant fluid heating. The heated refrigerant passes from evaporator 64 through supply lines 119, 119a including a reversing valve 115 and is dumped into accumulator 72. The warm saturated vapor separates from the warm liquid stored in the accumulator. The saturated vapor is drawn through suction line 74 into compressor inlet 76 after passing through suction line heat exchanger 78 further heating the warm vapor. In compressor 62 the vapor is compressed into a high pressure, superheated refrigerant gas and is discharged into heat exchanger 55 at an approximate temperature of 210° F. (depending on the ambient temperature and water temperature) through compressor discharge lines 79, 79a and reversing valve 115.

After heat exchange to fluid W occurs, a condensed, high pressure refrigerant fluid having a fluid temperature of approximately 118° F. leaves heat exchanger 55 and returns to heat pump 61 through line 83 for subcooling and recycling. Manifold check valve 81 directs the hot refrigerant fluid into suction line heat exchanger coil 85 where cooling down to 100° F. to 110° F. is effected; the heat from the coil 85 being utilized to provide additional heating of refrigerant vapor in suction line 74 entering the compressor 62. Further cooling down to temperatures of 70° F. to 80° F. occurs in accumulator subcooling coil 87; the heat from the coil being utilized to boil off more vapor to the compressor 62. The refrigerant fluid from coil 87 next enters subcooling expansion valve 90. Valve 90 is controlled by temperature sensor 91, positioned against line 83 to detect the temperature of refrigerant fluid entering heat exchanger coil 85 to adjust the valve opening. As the high pressure refrigerant flows through valve 90, refrigerant pressure and temperature again is reduced to that of evaporator 64 (approximately 40° F.), where the refrigerant fluid is to be reheated. In passing back to the coil 70 in evaporator 64, the fluid goes through valve 81 and line 57.

For the purpose of enabling heat pump 61 operation at ambient temperatures in excess of 70° F., modulating means is provided. Preferably such modulating means includes modulating control circuit 95 connected with modulating motors 97, 97a by electric control lines 99, 99a. As shown in FIG. 2, connecting links 101, 101a operatively connect damper crank arms 103, 103a of modulating motors 97, 97a to damper vanes 105, 105a positioned at the air exit 106 and entry opening 106a. A refrigerant temperature sensor 107 is attached to the accumulator supply line 119a and modulating control circuit 95 thus detects refrigerant fluid temperature after the refrigerant fluid passes through evaporator 64 and before compression of the fluid in compressor 62. Placement of sensor 107 in this preferred manner permits greater control over refrigerant fluid temperature and prevents refrigerant fluid from boiling out of evaporator coil 70, as discussed below.

When temperature sensor 107 detects a fluid temperature signal within a predetermined temperature range of approximately 35° F. to 50° F., preferably about 45° F. corresponding to ambient temperatures of approximately 70° F., modulating control circuit 95 energizes modulating motors 97, 97a at least partially closing damper vanes 105, 105a, thereby restricting the flow of ambient air through evaporator coil 70 and out the exit opening 106. This action prevents refrigerant from boiling out of the coil 70 too rapidly and overheating the compressor 62. As ambient temperatures and refrigerant fluid temperature increase within the above temperature ranges modulating control circuit 95 progressively closes damper vanes 105, 105a. When ambient temperatures exceed approximately 110° F. on hot or windy days, the damper vanes completely close off air exit 106 and entry opening 106a to prevent excessive refrigerant fluid heating. As dampers 105, 105a completely seal off evaporator coil 70 from the ambient air, modulating control circuit 95 also shuts down evaporator fan motor 112. By controlling the refrigerant fluid temperature through regulating the flow of ambient air in this manner, heat pump 61 is capable of reliable operation during windy days and periods of high ambient temperatures, even temperatures exceeding 100° F. Thus, the feature of controlling refrigerant fluid temperature with the above modulating means renders unnecessary resort to costlier, less efficient heating systems.

A modulating control circuit 95 responsive to temperature sensor 107 and capable of operating modulating motors 97, 97a and evaporator fan 64a in the above preferred manner, includes an integrated circuit TRIAC controller having a feedback potentiometer, balancing relay and a controller potentiometer, such as a Series 90 control available from Honeywell, Inc., Minneapolis, Minn.

Figure 3:
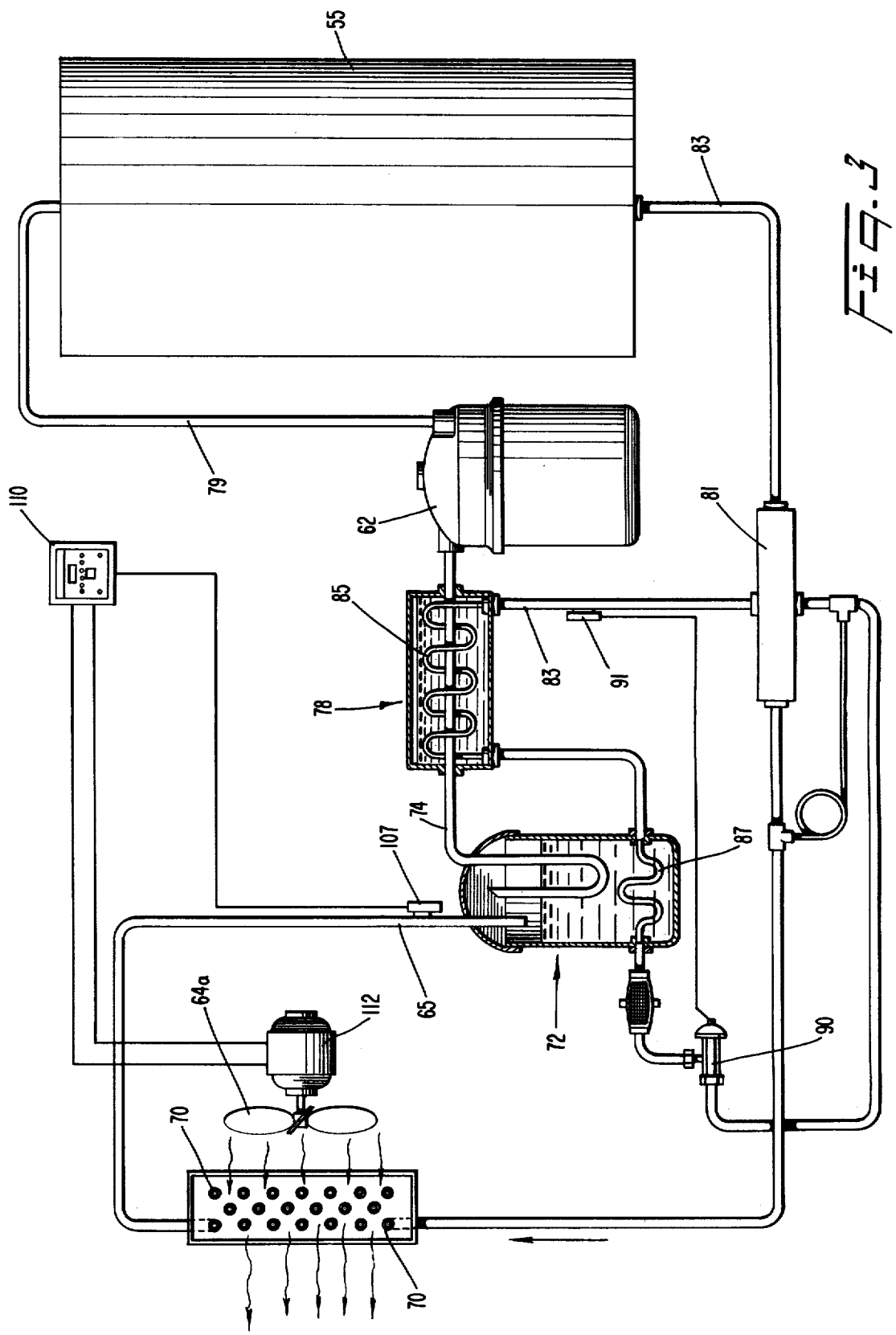
FIG. 3 is similar to FIG. 2 but shows a simplified system including the concept of restricting ambient air flow by controlling the fan speed.

FIG. 3 illustrates a different embodiment for regulating refrigerant fluid temperature by controlling the flow of ambient air through evaporator coil 70. As shown in FIGS. 3 and 8, a fan speed control circuit 110 is connected to fan motor 112. Temperature sensor 107 is positioned to detect the temperature of refrigerant fluid along supply line 65 entering accumulator 72. Fan speed control circuit 110 senses fluid temperature in line 65 and speeds up fan 64a, or slows it down, through regulation of voltage cycles supplying current to fan motor 112. Controlling fan speed with circuit 110 enables heat pump 61 to operate reliably at higher than normal ambient temperatures by regulating the required amount of Freon to be boiled off. The compressor motor windings are kept cool, thus preventing shutdown due to overloading. Control circuit 110 is preferably a solid state fan speed controller, such as the Tamarack model manufactured by Wallace Co., Gainesville, Ga. 30501.

FIG. 8 illustrates the control of fan speed in relation to refrigerant fluid temperatures detected by temperature sensor 107. As shown in FIG. 8, when refrigerant fluid temperature is at or about 45° F., fan 64a is running at full speed. As mentioned above, a 45° F. fluid temperature corresponds approximately to an ambient temperature of 70° F. When temperature sensor 107 detects fluid temperatures in excess of about 45° F., the fan speed is reduced, as shown in the graph of FIG. 8, to control the amount and temperature of refrigerant fluid being pulled into the compressor through suction line 74. As fluid temperatures begin to rise above 45° F., the fan motor speed decreases and eventually shuts off at a temperature of 100°-110° F., thereby preventing fluid from boiling out of coil 70 and compressor 62 overheating, while providing the compressor with a sufficient flow of hot Freon gas to heat exchanger 55. The feature of slowing fan motor 112 with fan speed control circuit 110 enables heat pump 61 to operate for longer periods and at higher than normal ambient temperatures than conventional heat pumps.

For the purpose of melting ice or frost accumulation on evaporator coil 70, tending to interfere with refrigerant fluid heating, reversing valve means is provided for directing hot refrigerant fluid discharged from compressor 62 to coil 70 in a defrost cycle. As shown in FIG. 2, such reversing valve means preferably includes reversing valve 115 in which flow reversing may be effected when temperature sensor 117, such as RANCO Time-Temperature, Model E15-2501; distributed by Westinghouse Corp., Norman, Okla., detects temperatures just downstream of evaporator coil 70 indicating icing conditions of 26° F. ±3° F. Under these conditions a defrost control circuit 118 connected to sensor 117 energizes valve 115, transferring hot gas from compressor discharge line 79 through valve 115 and line 119 to defrost coil 70. Modulating motors 97, 97a are also automatically energized by sensor 107 when it reaches the 45° F. temperature setting, for the purpose of closing air exit 106 and entry opening 106a with dampers 105, 105a to insulate coil 70 from cold ambient air and facilitate defrosting.

Figure 4:
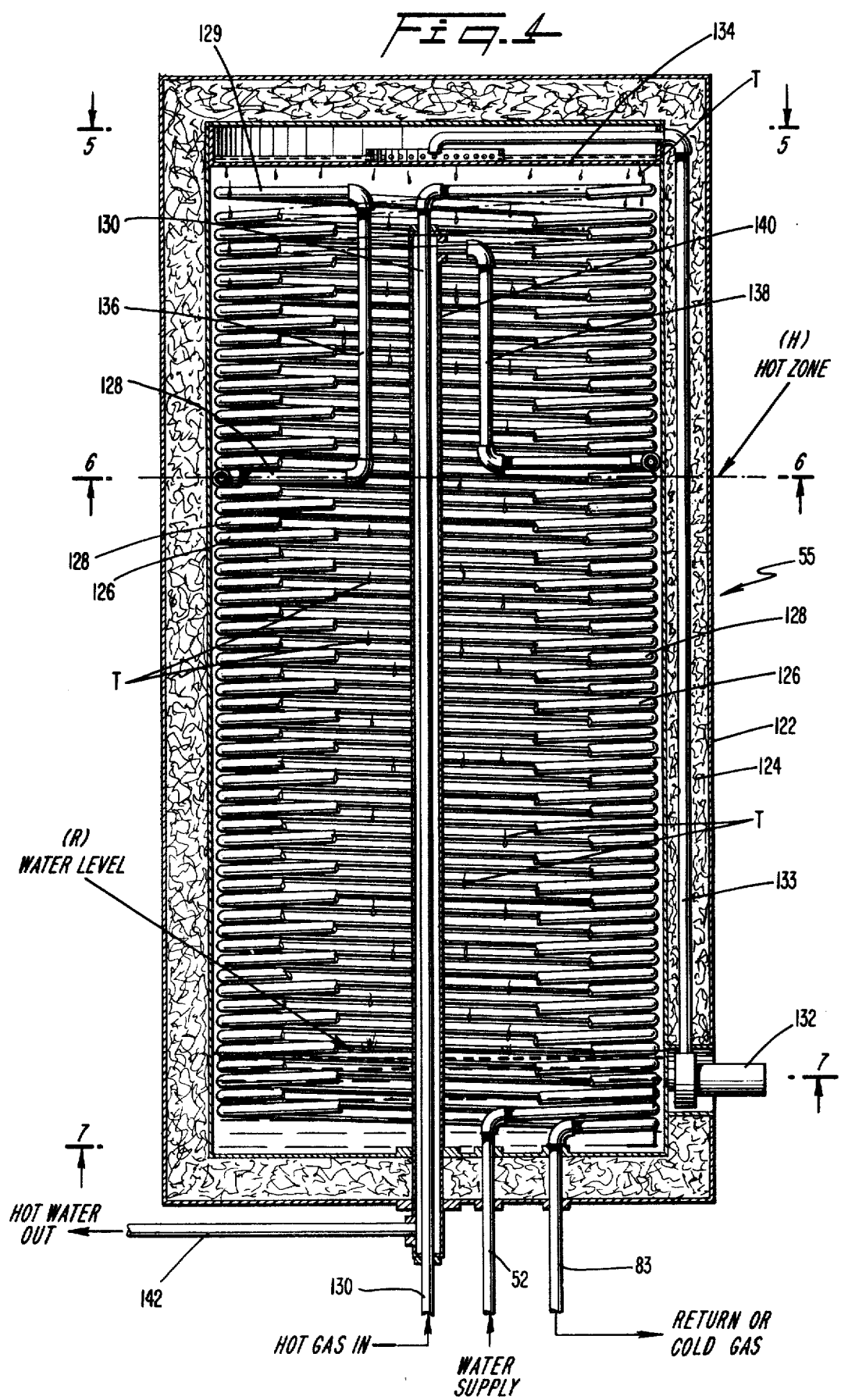
FIG. 4 is a side elevation view of the heat exchanger for the heat pump.
Figure 7:
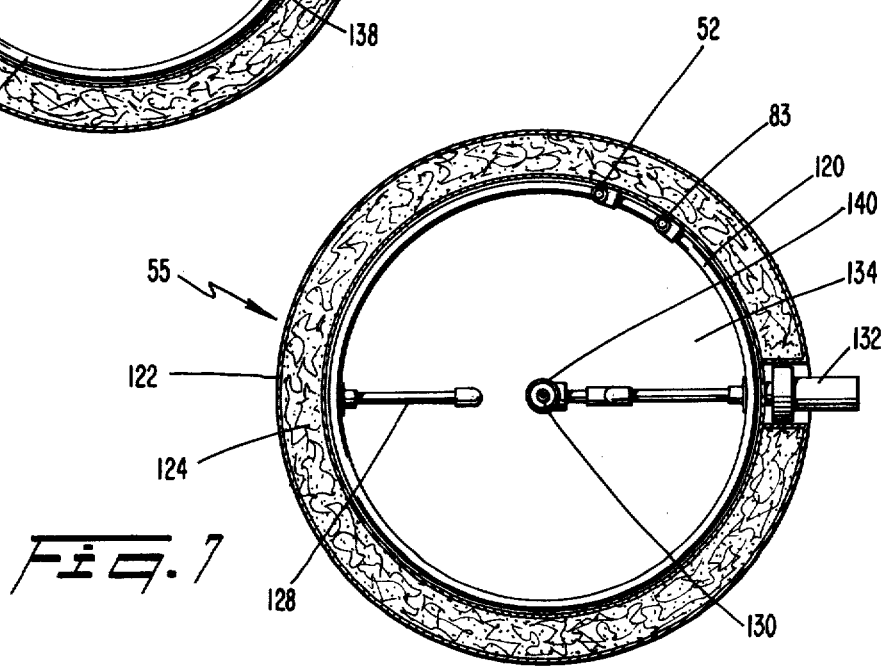
FIG. 7 is a detailed cross-sectional view taken along the line 7—7 of FIG. 4, illustrating the inlet for the hot refrigerant gas and the low temperature working fluid at the bottom of the heat exchanger.

For the purpose of effecting heat transfer between hot refrigerant fluid discharged from compressor 62 and low temperature working fluid W, heat exchanger 55 is provided. As shown in FIG. 4 heat exchanger 55 preferably includes casing 122 and insulation material 124 enclosing separate coils 126, 128 for refrigerant fluid and low temperature fluid, respectively; positioned so that each turn of coil 126 is adjacent the other coil 128. Hot refrigerant fluid of approximately 210° F. enters heat exchanger 55 through vertical riser pipe 130 (FIG. 7) attached to compressor discharge line 79a and is transferred to a top coil of coil system 126 to course downward. Working fluid W enters heat exchanger 55 through inlet pipe 52 and is caused to circulate upward through coils 128 under the influence of circulation pump 59. A third fluid transfer medium T, such as water, is stored in reservoir R at the bottom of the heat exchanger. The transfer fluid is pumped through vertical riser pipe 133 by circulation pump 132 (FIG. 7) and discharged into distribution pan 134 positioned above coils 126, 128.

Figure 5:
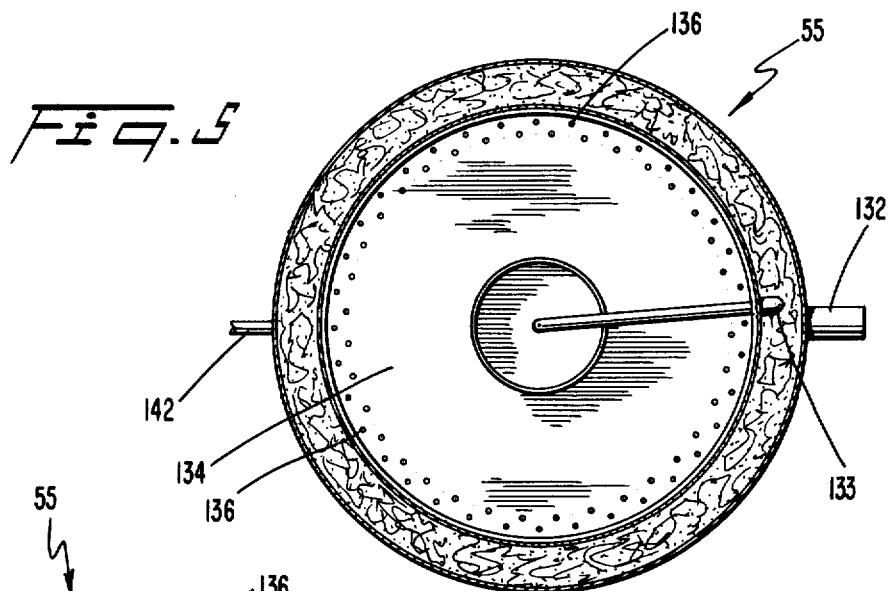
FIG. 5 is a detailed cross-sectional view taken along the line 5—5 of FIG. 4, illustrating the distribution pan at the top of the heat exchanger.
Figure 6:
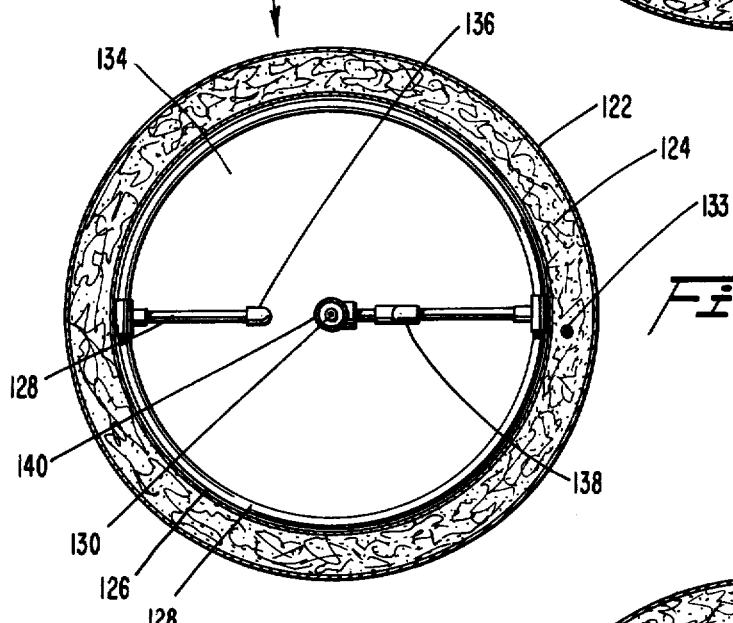
FIG. 6 is a detailed cross-sectional view taken along the line 6—6 of FIG. 4, illustrating the structure at the hottest point in the heat exchanger approximately one-third down from the top of the coil system.

As shown in FIG. 5, distribution pan 134 includes a plurality of holes 136 peripherally disposed in the pan surface, enabling the transfer medium to course down over coils 126, 128, alternately picking up and losing heat as it passes from a hot coil 126 to a cold coil 128, thereby effecting heat transfer to working fluid W. In this heat exchange relationship, transfer fluid does not achieve a maximum temperature until it has dripped down approximately one-third the height of the coils into hot zone H. For this reason, and in order to provide rapid and maximum temperature heating of working fluid W, vertical riser pipe 136 is provided for transferring fluid from a coil 128 located within hot zone H to a top coil 129 where the working fluid is caused to course downward back to the hot zone in rapid heat transfer relationship with hot refrigerant carried in coils 126 (FIG. 4). With this design, fluid temperature is raised approximately 10° F. before entering vertical riser pipe 136. Fluid temperature is raised an additional 10° F. as it courses downward from top coil 129 back to the hot zone. A vertical riser pipe 138 then carries heated fluid to discharge pipe 140, transferring fluid out of heat exchanger 55 through outlet pipe 142. As shown in FIGS. 4 and 6, pipe 140 surrounds hot gas inlet 130, thereby effecting additional fluid heating of approximately 5° F. before final discharge into pipe 142.

As shown in FIG. 1, after heated working fluid is transferred out of heat exchanger 55 through discharge pipe 142, the fluid is carried out of heating system 10 through outlet pipe 143, for supplying usable hot water when required. Outlet pipe 143 is connected to pipe 142 with T-connector 144. Heated fluid is also stored in secondary fluid storage tanks 145. Tanks 145 are connected to pipe 142 with feed pipe 146 positioned intermediate T-connectors 144, 147 and receive fluid through inlet pipes 148, 148a attached to the top of the tanks. Storage tanks 145 are similar in construction to primary fluid storage tanks 14, as described above.

For the purpose of maintaining fluid temperatures between 110° F. to 130° F., return pipe 150 and T-connectors 151, 152 interconnect tanks 145 in parallel to heat exchanger inlet pipe 52 transferring fluid to heat exchanger 55 with circulation pump 59. Circulation pump 59 may be continuously operating, enabling temperature sensor 60 to detect fluid temperature and energize heat pump 61 when additional heating is necessary.

For the purpose of intermixing heated fluid in tanks 145 with fluid in storage tanks 14, third circulation pump 153 and pipe 155 interconnect the storage tanks between T-connectors 151, 16a. Pump 153 is responsive to a separate thermostat control 154 and is energized when panel temperature sensor 29a detects a panel temperature at or below 85° F. Mixing effected in this manner facilitates maximum efficiency of storage units during periods when solar radiation is not available. Accordingly, at panel temperatures in excess of 85° F. mixing is usually not required and pump 153 shuts off. Check valve 157 is provided along pipe 155 for the purpose of preventing a reverse flow into storage tanks 145 of cold working fluid initially entering system 10 through inlet pipe 12.

The foregoing description of a preferred embodiment of the present invention has been presented for purposes of illustration and description. It is not intended to be exhaustive or to limit the invention to the precise form disclosed, and obviously many modifications and variations are possible, in light of the above teachings. For example, where heating system 10 use is contemplated in desert areas of the country, a mixing valve and pressure relief valve placed along inlet pipe 52 (not shown) may be desirable to prevent excessive heating of working fluid. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

1. A heat pump heating system, comprising, in combination:
  (a) heat pump means including a compressor, an evaporator and heat exchanger means interconnected and charged with refrigerant fluid to produce heat, said heat exchanger means effecting heat transfer between the hot refrigerant fluid from said compressor and a low temperature working fluid;
  (b) first temperature sensing means for detecting the temperature of said low temperature working fluid entering said heat exchanger means, and means for energizing said heat pump for supplying said hot refrigerant fluid to said heat exchanger when said low temperature working fluid is a predetermined temperature;

(c) an evaporator fan mounted for circulating ambient air over said evaporator to extract heat from the air;

(d) motor means for driving said fan;

(e) refrigerant temperature sensing means for sensing refrigerant fluid temperature after said refrigerant fluid passes through said evaporator; and (f) modulating means responsive to said refrigerant temperature sensing means for controlling the flow of ambient air through said evaporator to maintain a predetermined temperature range of said refrigerant fluid, said modulating means being operative to restrict air flow during periods of high ambient temperature thereby enabling said heat pump to operate at higher than normal outdoor temperatures.

2. In a heat pump including a compressor, an evaporator and heat exchanger means interconnected in a refrigerant flow relationship, and a fan driven by motor means for circulating ambient air over said evaporator to extract heat from the air; the improvement comprising refrigerant temperature sensing means for detecting refrigerant fluid temperature after said refrigerant fluid passes through said evaporator, and modulating means responsive to said refrigerant temperature sensing means for controlling the flow of ambient air through said evaporator to maintain a predetermined temperature range of said refrigerant fluid, said modulating means being operative to restrict air flow during periods of high ambient temperature thereby enabling said heat pump to operate at higher than normal outdoor temperatures.

3. A heat pump heating system according to claim 1 or 2, wherein said modulating means includes a modulating control circuit connected to the motor means, said control circuit being responsive to said refrigerant temperature sensing means for restricting the flow of ambient air through said evaporator to maintain a predetermined temperature range of said refrigerant fluid by reducing the fan speed during periods of high ambient temperature.

4. A heat pump heating system according to claim 1 or 2, wherein said modulating means includes a modulating motor, damper means operated by the modulating motor and positioned to cover an opening exposing said evaporator to ambient air, and a modulating controller energizing said modulating motor for opening and closing said damper means to maintain a predetermined temperature range of said refrigerant fluid.

5. A heat pump heating system according to claim 4, said damper means comprising a plurality of damper vanes operated by said modulating motor, said damper vanes being operative to cover portions of said evaporator directly exposed to ambient air.

6. A heat pump heating system according to claim 1 or 2, wherein said heat pump means further includes an accumulator, said refrigerant temperature sensing means being positioned to detect refrigerant fluid temperature before said fluid enters the accumulator.

7. A heat pump heating system according to claim 1, wherein said heat pump means further comprises reversing valve means for directing hot refrigerant fluid discharged from the compressor to the evaporator, thereby melting ice or frost accumulation on said evaporator during a defrost cycle.

8. A method for improving the efficiency of a heat pump utilizing ambient air for heating refrigerant fluid within an evaporator, enabling said pump to operate at higher than normal outdoor temperatures, comprising the steps of sensing the refrigerant fluid temperature after said refrigerant flows out of an evaporator; transmitting a temperature signal to a modulating control circuit; and restricting ambient air flow through said evaporator in response to said control circuit to maintain a predetermined temperature range of said refrigerant fluid.

9. A solar assisted heat pump fluid heating system, comprising, in combination:

(a) solar heating means including solar heat collecting means, solar heat exchanger means and first circulating means interconnected and charged with heat transfer fluid for effecting heat transfer between the heated heat transfer fluid and a low temperature working fluid;

(b) solar temperature sensing means for detecting temperatures within the solar heating means;

(c) primary fluid storage means for storing low temperature working fluid interconnected with said solar heat exchanger means;

(d) control means responsive to said solar temperature sensing means for energizing first circulating means to supply hot fluid from said solar heat exchanger effecting heat transfer when said solar sensing means detects a predetermined temperature;

(e) heat pump means including a compressor, an evaporator and heat exchanger means interconnected and charged with refrigerant fluid to produce heat, an evaporator fan mounted for circulating ambient air over said evaporator to extract heat from the air, and motor means for driving said fan, said heat exchanger means effecting heat transfer between the hot refrigerant fluid from said compressor and a low temperature working fluid;

(f) first temperature sensing means for detecting the temperature of said low temperature working fluid entering said heat exchanger means, means for energizing said heat pump for supplying said hot refrigerant fluid to said heat exchanger when said low temperature fluid is a predetermined temperature;

(g) second circulating means for transferring low temperature working fluid between said heat exchanger means and primary fluid storage means;

(h) fluid secondary storage means interconnected with said heat exchanger means for storing heated fluid;

(i) piping means interconnecting fluid secondary storage means with second circulating means for recirculating heated working fluid to heat exchanger means, thereby maintaining said fluid temperature within a predetermined temperature range; and (j) piping means interconnecting fluid secondary storage means and primary fluid storage means, and third circulating means for mixing low temperature working fluid.

10. A heating system according to claim 9, wherein said heat pump means further includes refrigerant temperature sensing means for detecting refrigerant fluid temperature after said refrigerant fluid passes through said evaporator and before compression of said refrigerant fluid in the compressor, and modulating means responsive to said refrigerant temperature sensing means for controlling the flow of ambient air through said evaporator to maintain a predetermined temperature range of said refrigerant fluid, said modulating means being responsive to restrict air flow during periods of high ambient temperature thereby enabling said heat pump to operate at higher than normal outdoor temperatures.

11. A heating system according to claim 9, wherein heat exchanger means includes an outer casing, separate coils for refrigerant fluid and low temperature working fluid positioned so that each turn of coil is adjacent the other coil, a reservoir having a third fluid transfer medium and a distribution pan enabling said transfer medium to course down over the coil system, alternately picking up and losing heat as it passes from a hot coil to a cold coil, pipe means for conducting incoming working fluid from a substantially highest temperature coil to a top coil, second fluid transfer means for conducting downward coursing heated working fluid from a substantially highest system temperature coil to outlet means surrounding a separate hot refrigerant fluid inlet, thereby effecting additional heat transfer.

12. A heating system according to claim 9, wherein said third circulating means is responsive to said control means for effecting mixing only when the ambient temperature at the solar collecting means is below a predetermined temperature.

13. A heating system according to claim 9, wherein second circulating means is in continuous operating condition.

14. A heating system according to claim 9, wherein solar temperature sensing means includes a plurality of sensors positioned for detecting temperatures at solar collecting means and primary fluid storage means.

15. A heating system according to claim 14, wherein said control means energizes first circulating means when a predetermined temperature differential is detected by the control means.

16. A heating system according to claim 15, wherein said control means energizes first circulating means at a temperature differential of approximately, 20° F.

17. A heating system according to claim 12, wherein said third circulating means is energized when the ambient temperature at solar collecting means is below substantially 85° F.

18. A heating system according to claim 1 or 9, wherein said heat pump means is energized when first temperature sensing means detects a working fluid temperature of approximately 94° F.

19. A heating system according to claim 9, wherein said solar heat exchanger means is positioned within primary fluid storage means.

20. A heating system according to claim 9, wherein primary fluid storage means includes at least one storage tank.

21. A heating system according to claim 9, wherein solar heat collecting means includes at least one solar collecting panel.

22. A heating system according to claim 9, further comprising supply inlet means for delivering low temperature working fluid to primary fluid storage means from a fluid supply source.

23. A heating system according to claim 9, further comprising outlet means for delivering heated low temperature working fluid leaving said heat exchanger means.

24. A heat pump heating system according to claim 1, further comprising fluid storage means interconnected with heat exchanger means for storing heated low temperature working fluid.

25. A heat pump according to claim 1 or 2 or 10, wherein said modulating means maintains refrigerant fluid temperatures within an approximate range of 35° F.-50° F.

26. A heating system according to claim 9 or 10, wherein said heat pump means further comprises reversing valve means for directing hot refrigerant fluid discharged from the compressor to the evaporator, thereby melting ice or frost accumulation on said evaporator during a defrost cycle.

27. A heating system according to claim 7, said heat pump means further comprising temperature sensing means positioned at the evaporator to detect temperatures indicating icing conditions, and control means responsive to said temperature sensing means for energizing reversing valve means when icing conditions are detected in the evaporator.

28. In the heat pump system of claim 1 or 2, said refrigerant temperature sensing means being further positioned to sense refrigerant fluid temperature before compression of said refrigerant fluid in the compressor.

29. The system of claim 9, wherein said second circulating means operates substantially continuously to circulate fluid from the primary storage means to the heat exchange means.

30. In a heat pump including a compressor, an evaporator and heat exchanger means interconnected in a refrigerant flow relationship, and a fan driven by motor means for circulating ambient air over said evaporator to extract heat from the air; the improvement comprising refrigerant operating parameter sensing means for detecting a refrigerant operating parameter after said refrigerant fluid passes through said evaporator, and modulating means responsive to said refrigerant sensing means for controlling the flow of ambient air through said evaporator to maintain a predetermined parameter range of said refrigerant fluid, said modulating means being operative to restrict air flow during periods of high ambient temperature thereby enabling said heat pump to operate at higher than normal outdoor temperatures.

31. A method for improving the efficiency of a heat pump utilizing ambient air for heating refrigerant fluid within an evaporator, enabling said pump to operate at higher than normal outdoor temperatures, comprising the steps of sensing an operating parameter of the refrigerant fluid after said refrigerant flows out of an evaporator; transmitting a parameter signal to a modulating control circuit; and restricting ambient air flow through said evaporator in response to said control circuit to maintain a predetermined parameter range of said refrigerant fluid.

* * * * *